(12) United States Patent
Ide et al.

(10) Patent No.: US 6,498,804 B1
(45) Date of Patent: Dec. 24, 2002

(54) METHOD OF DIRECTIONAL RECEPTION USING ARRAY ANTENNA, AND ADAPTIVE ARRAY ANTENNA UNIT

(75) Inventors: Minako Ide, Yokohama (JP); Sadaki Futagi, Sagamihara (JP); Katsuhiko Hiramatsu, Yokosuka (JP); Hideki Yukitomo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/381,621

(22) PCT Filed: Jan. 26, 1999

(86) PCT No.: PCT/JP99/00295
§ 371 (c)(1),
(2), (4) Date: Sep. 24, 1999

(87) PCT Pub. No.: WO99/39458
PCT Pub. Date: May 5, 1999

(30) Foreign Application Priority Data

Jan. 30, 1998 (JP) ............................................. 10/033744

(51) Int. Cl.[7] ............................................... H04L 27/30
(52) U.S. Cl. ........................ 375/144; 375/148; 375/347; 375/349
(58) Field of Search ................................. 375/144, 148, 375/316, 347, 349; 455/63, 137, 132, 134–136, 226.2, 101, 272, 275, 277.2, 504, 506; 370/320, 335, 342, 441

(56) References Cited

U.S. PATENT DOCUMENTS

| | | | | |
|---|---|---|---|---|
| 5,473,333 A | * | 12/1995 | Chiba et al. | 342/157 |
| 5,710,995 A | * | 1/1998 | Akaiwa et al. | 375/347 |
| 5,936,577 A | * | 8/1999 | Shoki et al. | 342/373 |
| 6,018,647 A | * | 1/2000 | Fitzgerald | 455/135 |
| 6,069,912 A | * | 5/2000 | Sawahashi et al. | 375/140 |
| 6,087,986 A | * | 7/2000 | Shoki et al. | 342/383 |
| 6,128,333 A | * | 10/2000 | Kinoshita et al. | 342/380 |

FOREIGN PATENT DOCUMENTS

| | | |
|---|---|---|
| JP | 6-196921 | 7/1994 |
| JP | 6-296119 | 10/1994 |
| JP | 7-86972 | 3/1995 |
| JP | 10215193 | 8/1998 |
| JP | 11-52988 | 2/1999 |

* cited by examiner

Primary Examiner—Chi Pham
Assistant Examiner—Khanh Tran
(74) Attorney, Agent, or Firm—Greenblum & Bernstein, P.L.C.

(57) ABSTRACT

When carrying out directive reception using an adaptive array antenna apparatus, a plurality of diversity reception circuits which differ in communication environment follow-up performance are used for reception and the reception output with the best reception quality is selected. The environment follow-up performance of the other non-selected diversity reception circuits is dynamically changed, preferably every time a selection is made by a selector based on the environment follow-up performance of a selected diversity reception circuit.

25 Claims, 7 Drawing Sheets

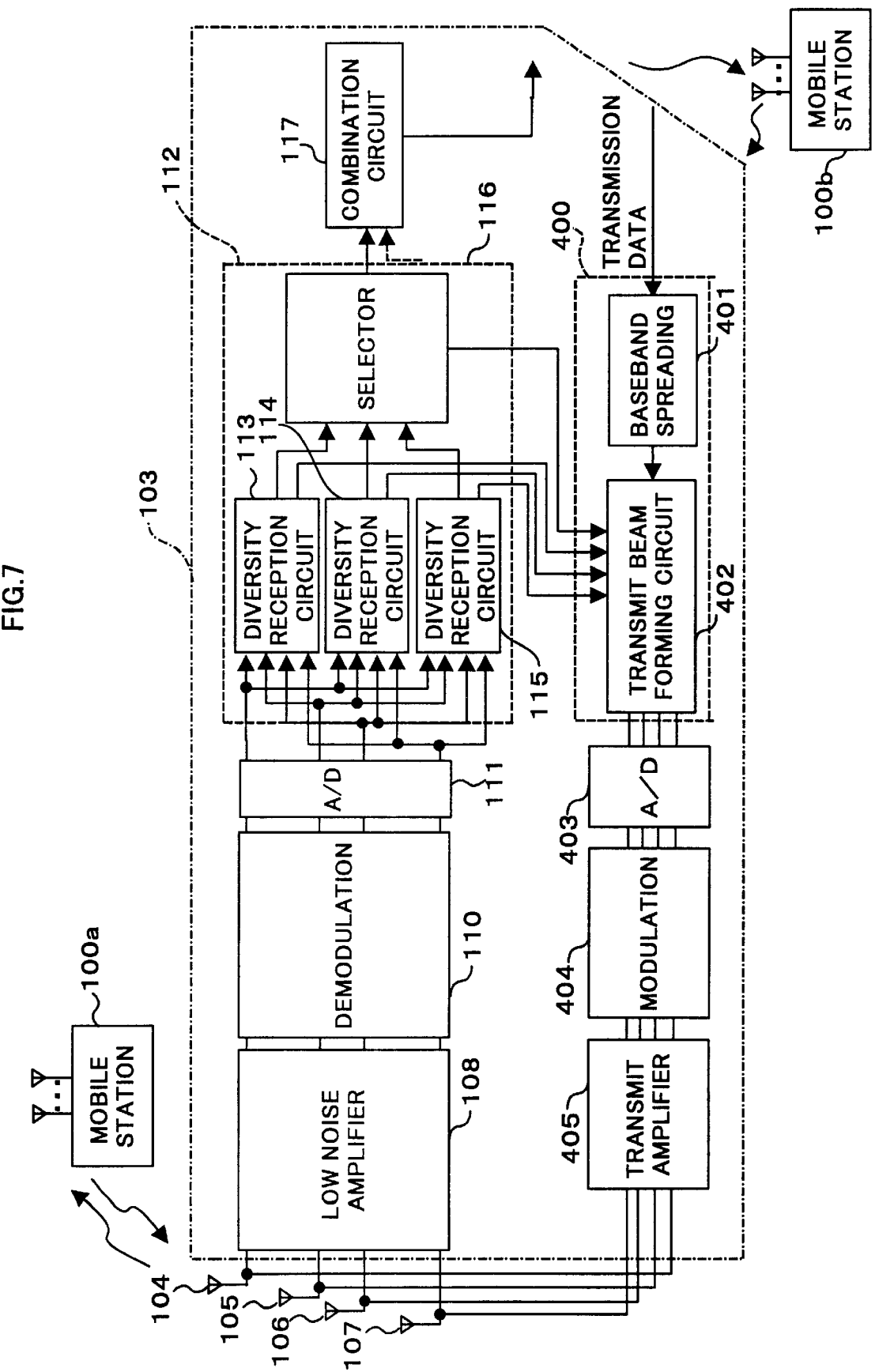

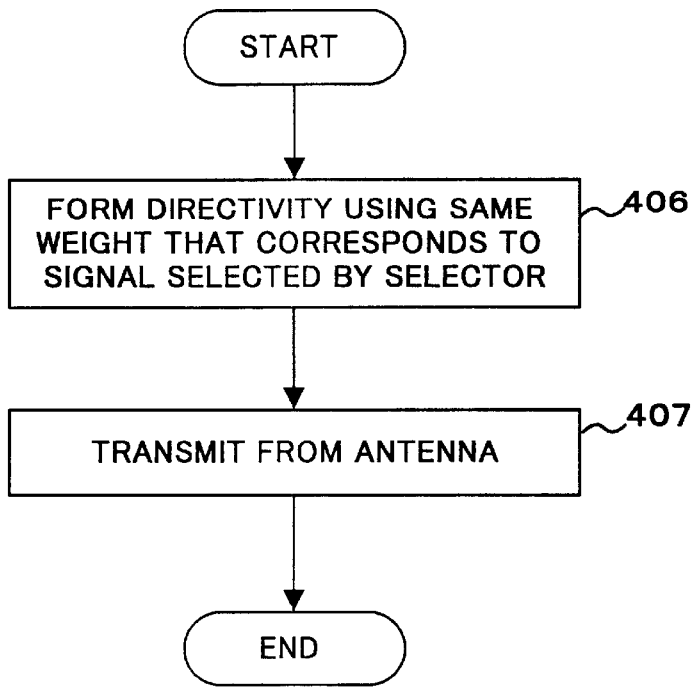
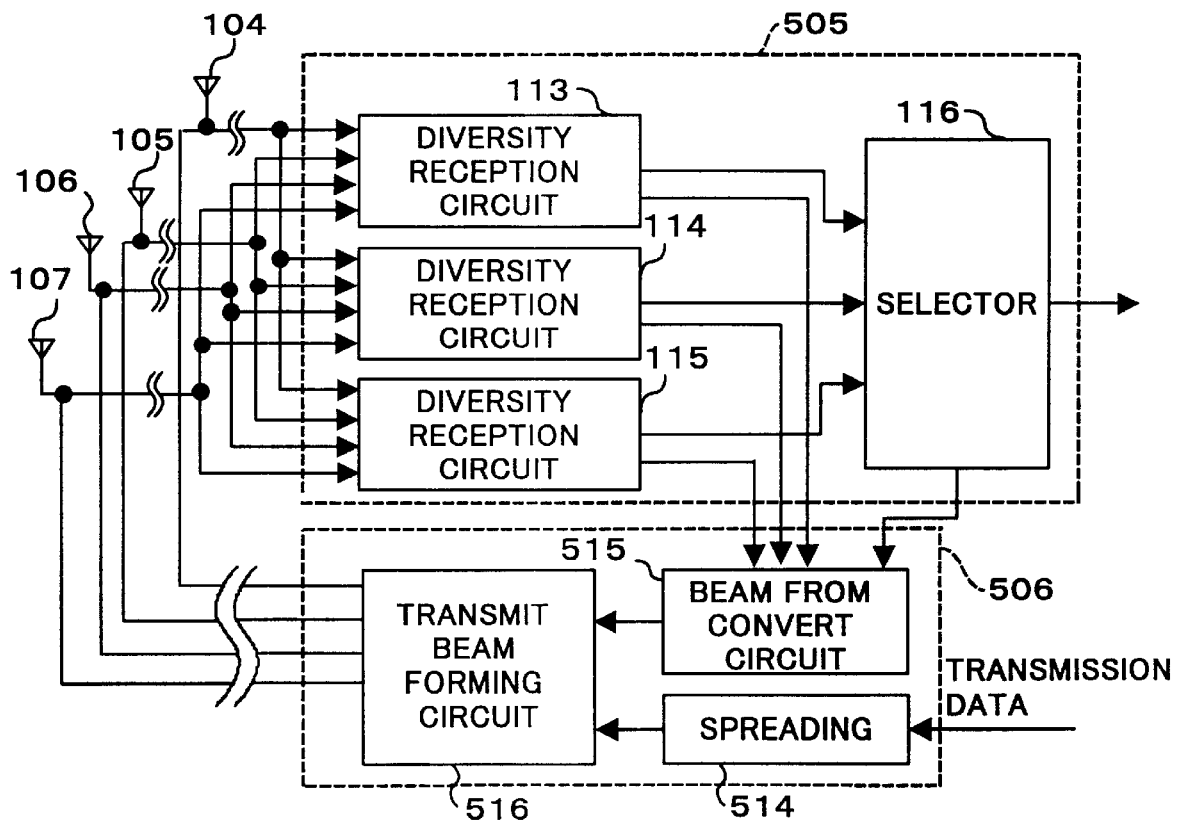

METHOD OF DIRECTIONAL RECEPTION USING ARRAY ANTENNA, AND ADAPTIVE ARRAY ANTENNA UNIT

TECHNICAL FIELD

The present invention relates to a directive reception method using an array antenna and an adaptive array antenna apparatus.

BACKGROUND ART

One of directivity antennas used in the digital radio communication field such as CDMA (Code Division Multiple Access) is an adaptive array antenna.

The adaptive array antenna is an antenna system that allows directivity to be changed by adaptively controlling the amplitude and phase of signals received through a plurality of antennas placed at regular intervals or signals to be transmitted through those antennas according to the communication environment. This provides effects such as enhancing the effect of eliminating interference or selectively receiving only a radio wave coming from a specific direction via a predetermined path, that is, reception based on a RAKE system.

However, implementing a practical adaptive array antenna requires overcoming numerous problems. In mobile bodies such as automobiles in particular, which change their position each moment, it is not easy to achieve high-speed and high-accuracy adaptation to a communication environment at the same time.

That is, if a mobile body on the transmitting side is moving, the receiving side must change reception directivity quickly to adapt itself to changes in the communication environment. However, the greater the variation in reception directivity per unit time by attaching importance to high-speed follow-up, the lower the accuracy of convergence to a target control value becomes. On the contrary, attaching importance to the accuracy of convergence may allow accurate convergence to a target control value, but would require longer time to converge.

Thus, when carrying out adaptive diversity reception, it is an important issue to determine the level of adaptability to the communication environment. However, a mobile body in mobile ratio communications may be stationary or moving slowly or fast and the direction of an incoming radio wave changes all the time, which makes it difficult to implement optimum follow-up to the communication environment.

DISCLOSURE OF INVENTION

It is one of the objectives of the present invention to provide a method and apparatus that will quickly follow up changes in a communication environment in mobile radio communications, etc. and realize accurate directive reception at the same time.

A directive reception method using an array antenna system of the present invention operates a plurality of diversity reception circuits with different environment follow-up characteristics placed in parallel and selects one of the outputs of the diversity reception circuits as a reception signal. Each of a group of diversity reception circuits with different communication environment follow-up characteristics operates so as to follow up the communication environment and the most appropriate one of the resultant reception signals is selected, achieving high-speed and high-accuracy directive reception.

A preferred mode of the present invention dynamically updates the environment follow-up characteristics of other diversity reception circuits based on the environment follow-up characteristic of the selected diversity reception circuit. The environment follow-up characteristics can be updated by changing parameter values that determine the environment follow-up characteristics.

In another preferred mode of the present invention, when changing the values of parameters that determine the environment follow-up characteristics, suppose the value of a basic parameter is $\mu 1$, and $\mu A$ and $\mu B$ that satisfy a relationship of $\mu A < \mu 1 < \mu B$ are obtained and at least one of $\mu A$ or $\mu B$ is used as a parameter value of another diversity reception circuit. It is desirable that both $\mu A$ and $\mu B$ be values close to $\mu 1$. This makes the follow-up performance of a plurality of diversity reception circuits adaptively change while maintaining close correlation with each other, enabling quick formation of desired directivity.

In still another preferred mode of the present invention, only a diversity reception circuit with high environment follow-up capability is operated in an initial state of directivity formation, then the environment follow-up characteristics of other non-operating diversity reception circuits are updated and their operations started based on its environment follow-up characteristic. This reduces power consumption of the circuits.

The directive reception mode using the adaptive array antenna of the present invention multiplies reception signals of a plurality of antenna elements by weighting coefficients, then uses a plurality of diversity reception circuits that combine those signals as the reception output to carry out directive reception and selects the optimum signal from the reception signals output in parallel. It is possible to update weighting coefficients step by step and change the environment follow-up characteristic of each diversity reception circuit by changing the amount of update per step. It is desirable that the amount of update per step of the weighting coefficient in a non-selected diversity reception circuit be changed based on the amount of update of the selected diversity reception circuit.

It is also possible to receive a baseband-spread signal transmitted from a mobile body using the adaptive directive reception method of the present invention and restrain the field intensity of the transmission wave to reduce interference between signals on a same frequency band.

The directivity communication method using the adaptive array antenna of the present invention not only performs high-speed reception directivity formation by selecting the outputs of a plurality of diversity reception circuits but also carries out directivity transmission using directivity formation information of a selected diversity reception circuit.

The adaptive array antenna apparatus of the present invention comprises at least one directive reception circuit that selectively receives only radio waves passing through a specific path from among incoming radio waves via a plurality of antenna elements and a plurality of paths. The directive reception circuit comprises a plurality of diversity reception circuits operating in parallel each having a different environment follow-up characteristic and selects the most appropriate output from the outputs of those diversity reception circuits as a reception signal. It is desirable to update the environment follow-up characteristics of diversity reception circuits which have not been selected in every selection. It is also possible to operate only diversity reception circuits with higher environment follow-up performance in an initial stage of the reception directivity formation and make other diversity reception circuits non-operable, thus reducing power consumption of the circuit.

Another mode of the present invention provides a combination circuit that applies RAKE-combination to the reception outputs of a plurality of directive reception circuits. This makes it possible to increase reception power.

Still another mode of the present invention also carries out directivity transmission using information to form reception directivity. This improves the communication quality in mobile communications.

The adaptive array antenna apparatus of the present invention can be used for a CDMA-based communication apparatus and a base station apparatus for CDMA communications.

BRIEF DESCRIPTION OF DRAWINGS

FIG. 7 is a block diagram showing an internal configuration example of a base station apparatus for mobile radio communications;

FIG. 8 is a flow diagram showing a characteristic operation of the directive reception circuit in FIG. 7;

FIG. 9 is a block diagram showing an internal configuration example of an adaptive array antenna apparatus with a directivity transmission function;

BEST MODE FOR CARRYING OUT THE INVENTION

With reference now to the attached drawings, the embodiments of the present invention are explained below.
(Embodiment 1)

Figure 1:
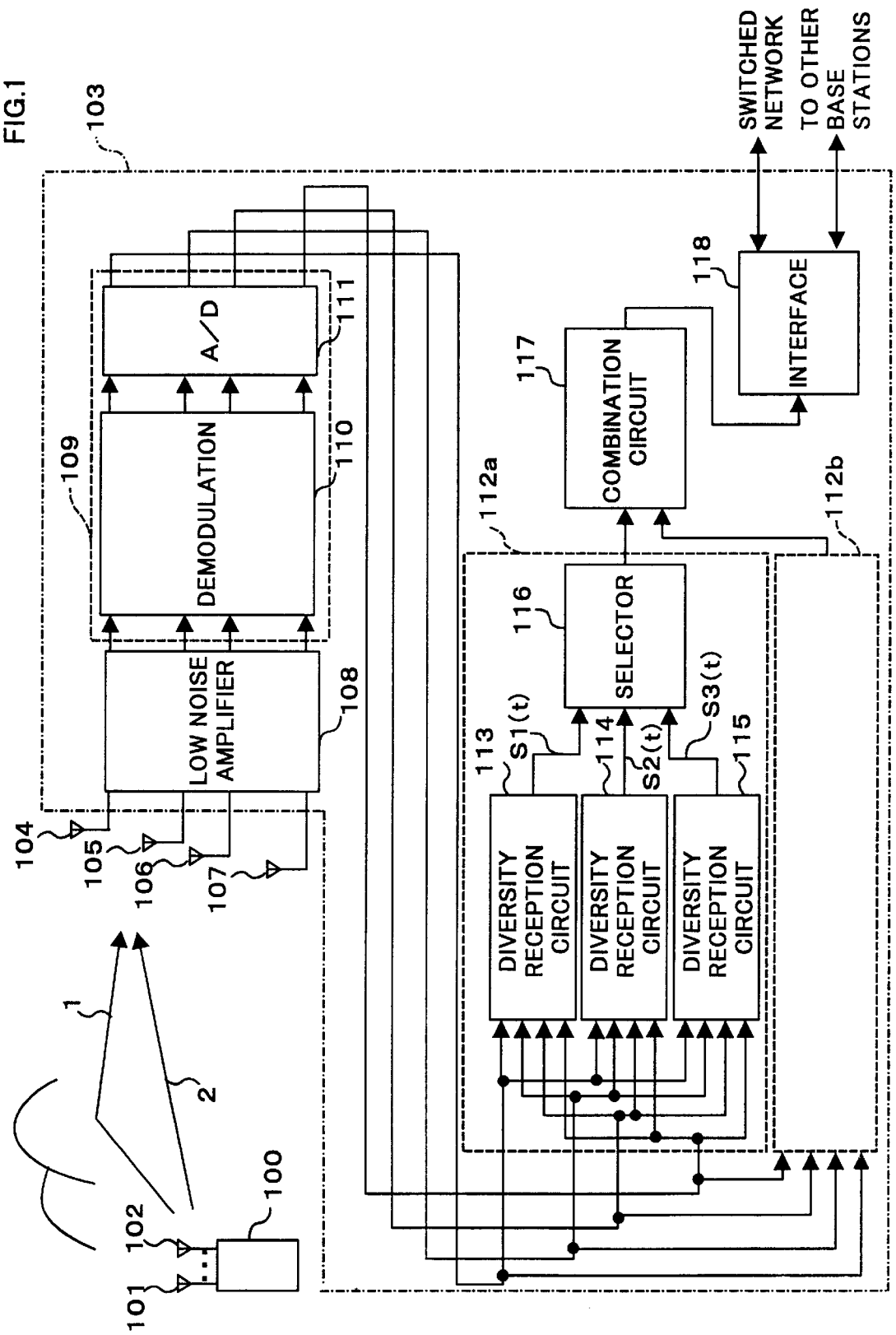
FIG. 1 is a block diagram of an embodiment of adaptive array antenna apparatus of the present invention.

FIG. 1 is a block diagram of an adaptive array antenna apparatus of Embodiment 1.

The adaptive array antenna apparatus outputs a signal resulting from multiplying signals received through a plurality of antenna elements by weighting coefficients Wi (i=1, 2, ..., n) and finding a sum of them. Even if the antenna elements themselves have no directivity, it is possible to change directivity by adaptively controlling the weighting coefficients. That is, it is possible to create points (null points) without directivity in an arbitrary direction.

For example, when a desired signal arrives from the direction indicated by reference symbol 701 in FIG. 12 and an interference signal arrives from the direction indicated by reference symbol 702, if reception directivity 703 is directed toward the desired wave, the desired wave is received strongly, while the interference signal is received weakly, which makes it possible to improve the quality of the reception signal.

In FIG. 1, base station 103 plays a role of a relay in CDMA communications. Base station 103 comprises 4 antennas 104 to 107. Radio waves transmitted through antennas 101 and 102 of mobile station (e.g., automobile) 100 are received using this group of antennas. The radio waves arrive at antennas 104 to 107 via path 1 and path 2.

The received analog signals are converted to intermediate frequency signals (IF) and amplified in circuit block 108 and inputted to radio signal processing section 109. In the radio signal processing section, demodulation circuit 110 performs quadrature demodulation and the demodulated signals are converted to digital signals by A/D converter 111. The converted digital signals are inputted to directive reception circuits (adaptive diversity reception circuits) 112a and 112b.

In the present embodiment, directive reception circuit 112a is provided to selectively receive radio waves arriving from mobile station 100 via path 1 and directive reception circuit 112b is provided to selectively receive radio waves arriving from mobile station 100 via path 2.

In the present embodiment, the signals received by directive reception circuits 112a and 112b are combined by RAKE combination circuit 117 and transmitted to a switched network or another base station via interface circuit 118.

What is noted here is that directive reception circuits 112a and 112b comprise a plurality of diversity reception circuits with different communication environment follow-up characteristics and a selector that selects the output of each diversity reception circuit.

As shown in the figure, directive reception circuit 112a comprises 3 diversity reception circuits 113, 114 and 115 with different communication environment follow-up characteristics and selector 116.

Each of diversity reception circuits 113 to 115 multiplies a signal received by each of antenna elements 104 to 107 by a weighting coefficient and combines those signals to form desired reception directivity. Selector 116 compares the quality of the combined signals output from the diversity reception circuits and selects the signal with the highest quality.

Figure 2:
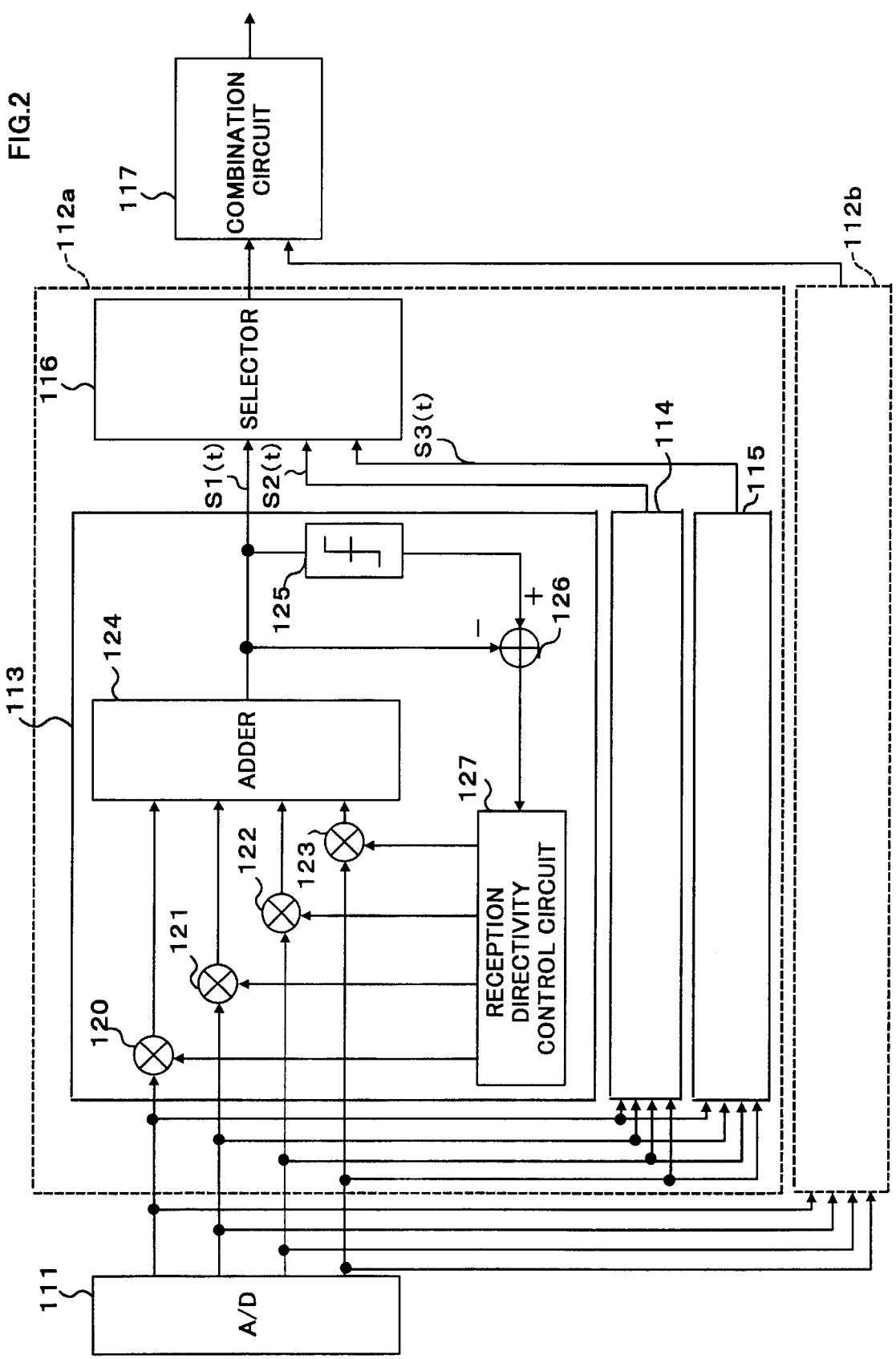
FIG. 2 is a block diagram showing an internal configuration of a directive reception circuit shown in FIG. 1.

FIG. 2 shows an internal configuration of diversity reception circuit 113. Diversity reception circuits 114 and 115 also have the same configuration.

As shown in the figure, diversity reception circuit 113 (114 and 115) comprises reception directivity control circuit 127, multipliers 120, 121, 122 and 123 that multiply a weighting coefficient output from reception directivity control circuit 127 by the input signals from antennas 104 to 107, adder 124 that combines the outputs of the multipliers, determination circuit 125 that determines the output of adder 124, error detector 126 that detects an error between the output of adder 124 and the determination result of determination circuit 125.

In diversity reception circuit 113 (114 and 115) with such a configuration, a directivity pattern is formed during reception as follows.

That is, suppose a signal from each of antennas 104 to 107 is Si(t) in vector expression and a weighting coefficient (weight) output from reception directivity control circuit 127 is Wi, then the output of adder 124 S(t) is expressed in expression (1) below.

$$S(t) = \sum_{i=1}^{4} Si(t) \cdot Wi^* \tag{1}$$

-continued $$= [S1, S2, S3, S4]\begin{bmatrix} W1^* \\ W2^* \\ W3^* \\ W4^* \end{bmatrix} = S1W1^* + S2W2^* + S3W3^* + S4W4^*$$

The asterisk symbols added to W in expression (1) denote conjugate complex numbers.

Determination circuit 125 determines the output of adder 124. Suppose the determination result is D(t), then error detector 126 outputs the difference (error) between D(t) and S(t) and gives it to reception directivity control circuit 127. Based on this, reception directivity control circuit 127 updates the weighting coefficient (weight) values so as to reduce the error.

For example, reception directivity control circuit 127 updates the weighting coefficients as shown in expression (2) below.

$$W(t+1)=W(t)+\mu(D(t)-S(t))^*Si(t) \quad (2)$$

If expression (2) is expressed using a matrix, it is expressed as shown in expression (3) below, and therefore the value is updated for every weighting coefficient as shown in expression (4).

$$\begin{bmatrix} W1(t+1) \\ W2(t+1) \\ W3(t+1) \\ W4(t+1) \end{bmatrix} = \begin{bmatrix} W1(t) \\ W2(t) \\ W3(t) \\ W4(t) \end{bmatrix} + \mu(D(t)-S(t))^* \begin{bmatrix} S1 \\ S2 \\ S3 \\ S4 \end{bmatrix} \quad (3)$$

$$\left.\begin{array}{l} W1(t+1) = W1(t) + \mu(D(t)-S(t))^*S1 \\ \vdots \\ W4(t+1) = W4(t) + \mu(D(t)-S(t))^*S4 \end{array}\right\} \quad (4)$$

In expressions (3) and (4), "$\mu$" is an update coefficient of a weighting coefficient and the amount of change by one update of a weighting coefficient depends on this value "$\mu$". In the present embodiment, this update coefficient $\mu$ is changed between diversity reception circuits 113 and 114 that operate in parallel, making each communication environment follow-up characteristic differ. That is, $\mu$ is a parameter that decides the environment follow-up characteristic of a directive reception circuit.

In the paragraphs below, the operation of a diversity reception circuit is explained in detail also taking expressions (1) to (4) above into consideration.

Diversity reception circuits 113 to 115 each multiply the input signals from antennas 104 to 107 by weighting coefficient (weight) wi, combine them into signals S1(t) to S3(t) and output them. Update coefficients $\mu$ of weighting coefficients (weights) in diversity reception circuits 113, 114 and 115 at this time are $\mu 1$, $\mu 2$ and $\mu 3$ and the update coefficient values are values varying in size and having a relationship of $\mu 1 < \mu 2 < \mu 3$.

If the transmitting side (that is, mobile station 100 in FIG. 1) is stopped, output S1(t) of diversity reception circuit 113 corresponding to "$\mu 1$" whose weighting coefficient (weight) has high convergence accuracy has the best reception quality, and therefore S1(t) is selected.

However, once the transmitting side starts moving, following-up with $\mu 1$ becomes difficult, and the reception quality of output signal S2(t) of the diversity reception circuit corresponding to $\mu 2$ which is greater than $\mu 1$ is better. Therefore, selector 116 switches the signal to be selected from S1(t) to S2(t).

As the transmitting side moves faster, following-up with $\mu 2$ also becomes difficult, and output signal S3(t) of diversity reception circuit 115 corresponding to $\mu 3$ which has the highest follow-up characteristic is selected.

As shown above, in the present embodiment, a plurality of diversity reception circuits with different weight update coefficients operate independently and adaptively to the environment, output directive reception signals and select the signal with the best quality. This allows accurate formation of reception directivity adaptable to the direction of incoming radio waves not only when the transmitting side is stopped or moving slowly but also when the mobile body is moving fast and the direction of incoming radio waves changes drastically.

(Embodiment 2)

Figure 3:
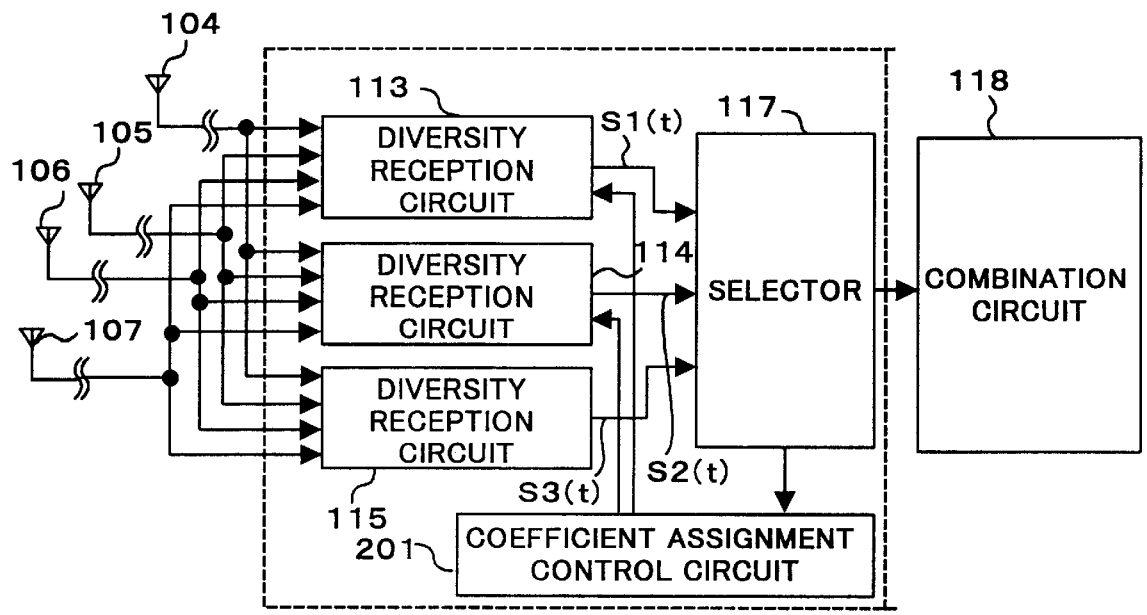
FIG. 3 is a block diagram of another example of directive reception circuit.

FIG. 3 is a block diagram showing a configuration of the main part of an adaptive array antenna apparatus of Embodiment 2 of the present invention.

The configuration of directive reception circuit 200 in FIG. 3 is basically the same as that of directive reception circuit 112a in FIG. 1, but directive reception circuit 200 differs in that it is provided with coefficient assignment control circuit 201.

The following is an explanation of characteristic operations of directive reception circuit 200.

In the present embodiment, every time selector 117 selects the output of one diversity reception circuit, weights and weight update coefficients of the other two diversity reception circuits are updated based on the weight and weight update coefficient of the selected diversity reception circuit and the selection continues.

That is, instead of operating in vain a diversity reception circuit which has not been selected by a first selection, its weight and weight update coefficient are adaptively changed so as to output a valid reception signal at the next selection, thus improving the reception accuracy.

The following is a detailed explanation:

Diversity reception circuits 113, 114 and 115 multiply the input signals from antennas 104 to 107 by weighting coefficients and combine them and output directive reception signals S1(t), S2(t) and S3(t).

The weights (weighting coefficients) at diversity reception circuits 113 to 115 at this time are W1, W2 and W3, and the weight update coefficients are $\mu 1$, $\mu 2$ and $\mu 3$, respectively. $\mu 1$, $\mu 2$ and $\mu 3$ have a relationship of $\mu 1 < \mu 2 < \mu 3$.

Selector 117 finds the reception quality of S1(t), S2(t) and S3(t), compares them and selects signal Si(t) ($1 \leq i \leq 3$) of the best reception quality.

Then, coefficient assignment control circuit 201 assigns the weight (one of W1 to W3) of the diversity reception circuit corresponding to Si(t) selected by selector 117 to a non-selected diversity reception circuit.

That is, the weight (weighting coefficients) of the non-selected diversity reception circuit is obviously inappropriate in respect of accurate follow-up to the environment compared to the weight of the selected diversity reception circuit, and as long as the weight remains the same the diversity reception circuit which has not been selected by the first selection is thought to be unable to further output appropriate reception signals. Therefore, once the first selection is made, the weight value of the selected reception circuit is set as the initial value of the weight of the other reception circuits.

Then, coefficient assignment control circuit 201 finds weight update coefficients $\mu$A and $\mu$B which have a relationship of $\mu A < \mu i < \mu B$ centered on weight update coefficient $\mu i$ (i=1, 2 and 3) and assigns $\mu$A and $\mu$B as the weight update coefficients of the remaining diversity reception circuits. $\mu A$ and $\mu B$ are approximate values.

Weights and weight update coefficients are assigned every time a selection is made. As a result, every time a signal to be selected is changed, weights and weight update coefficients in the non-selected diversity reception circuits are updated.

That is, if the output of one diversity reception circuit is selected, not only the weight of the diversity reception circuit is set to the other diversity reception circuits, but also $\mu A$ and $\mu B$ which have a relationship of $\mu A < \mu i < \mu B$ are assigned as the weight update coefficients of the remaining diversity reception circuits. Coefficient assignment control circuit 201 then detects how the quality of a reception signal changes depending on a difference in the weight update coefficients, starting with the same weight and selects the best one from them, and repeats this procedure so as to make both weights and weight update coefficients dynamically follow up changes in the communication environment.

Figure 4:
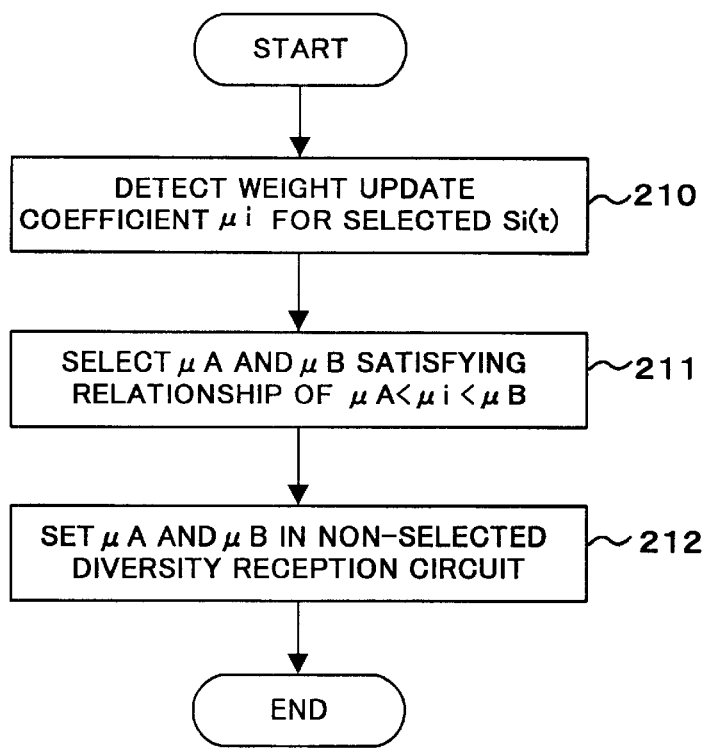
FIG. 4 is a flow diagram showing a characteristic operation of the directive reception circuit in FIG. 3.

The updating operation of weight update coefficients is summarized in FIG. 4.

That is, coefficient assignment control circuit 201 detects weight update coefficient $\mu i$ (i=1, 2, 3) for selected Si(t) (step 210), finds $\mu A$ and $\mu B$ which satisfy a relationship of $\mu A < \mu i < \mu B$ (step 211), and sets $\mu A$ and $\mu B$ in the non-selected diversity reception circuits (step 212).

According to the present embodiment as described above, every time the output of each diversity reception circuit is selected, it is possible to find a weight update coefficient close to the weight update coefficient centered on the optimum weight update coefficient and assign it to the remaining non-selected diversity reception circuits and make them follow up the moving condition of the transmitting side, thus making it possible to accurately update weighting coefficients.

(Embodiment 3)

Figure 5:
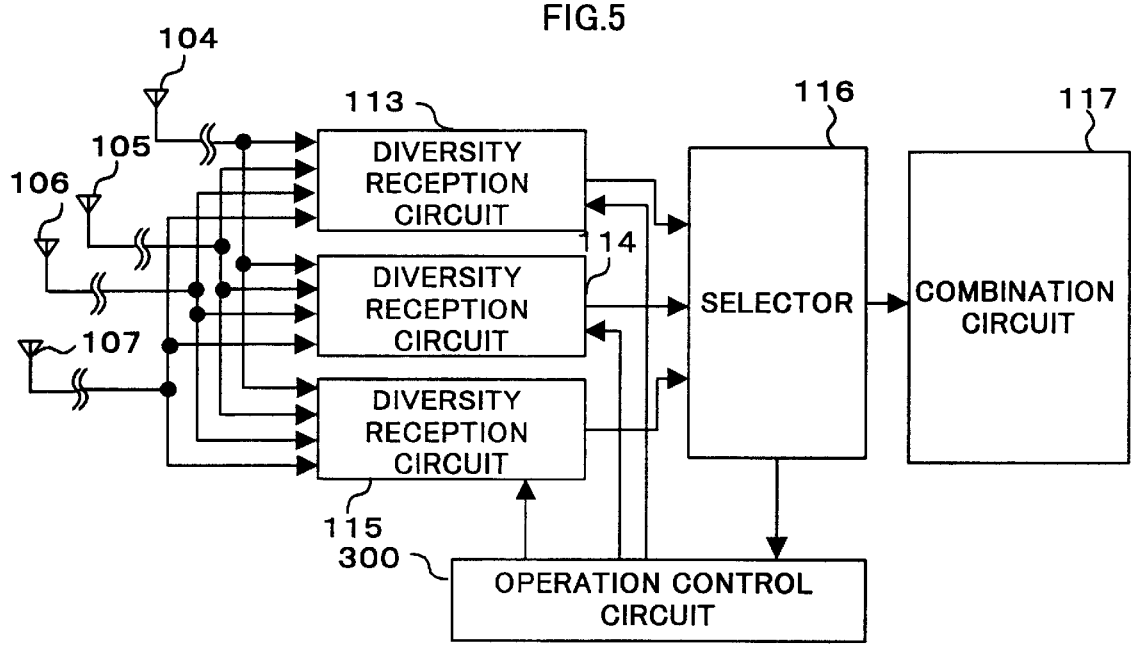
FIG. 5 is a block diagram of another example of directive reception circuit.

FIG. 5 is a block diagram showing a configuration of the main part of an adaptive array antenna apparatus of Embodiment 3 of the present invention.

The basic configuration and operation of the circuit of the present embodiment are the same as those of the aforementioned embodiment. In the present embodiment, however, 2-stage control is performed through the function of operation control circuit 300; first control intended for high-speed convergence and second control intended for accurate convergence.

A detailed explanation is given below.

First at the start of a reception operation, operation control circuit 300 operates diversity reception circuit 115 corresponding to weight update coefficient $\mu 3$ that converges fast. In the meantime, it stops operation of remaining diversity reception circuits 113 and 114.

Selector 116 finds the reception quality of output signal S3(t) of diversity reception circuit 115. When a variation per predetermined time of the reception quality obtained is within the range of a preset threshold, control circuit 309 determines that the weight has almost converged.

Then, it sets the converged weight value as the initial value of diversity reception circuits 113 and 114 that have not been operating so far. It also finds weight update coefficients $\mu 1$ and $\mu 2$ which have a relationship of $\mu 1 < \mu 2 < \mu 3$ and have mutually approximating values, sets them in diversity reception circuits 113 and 114 that have not been operating and starts a directive reception operation. Selector 116 selects the output with the best quality from among the outputs of diversity reception circuits 113 to 115. In this way a directive reception signal has been obtained.

That is, at least one of a plurality of reception circuits is operated initially, and then the same weight as the weight in the operating reception circuit is set in the other reception circuits. Then, a weight update coefficient which is slightly different from the weight update coefficient of the operating reception circuit is set in the other reception circuits and a reception operation is started. Selector 116 detects how the quality of the reception signal changes depending on a difference in weight update coefficients and selects the best one from among them and repeats this procedure so as to make both weights and weight update coefficients dynamically follow up changes in the communication environment.

Figure 6:
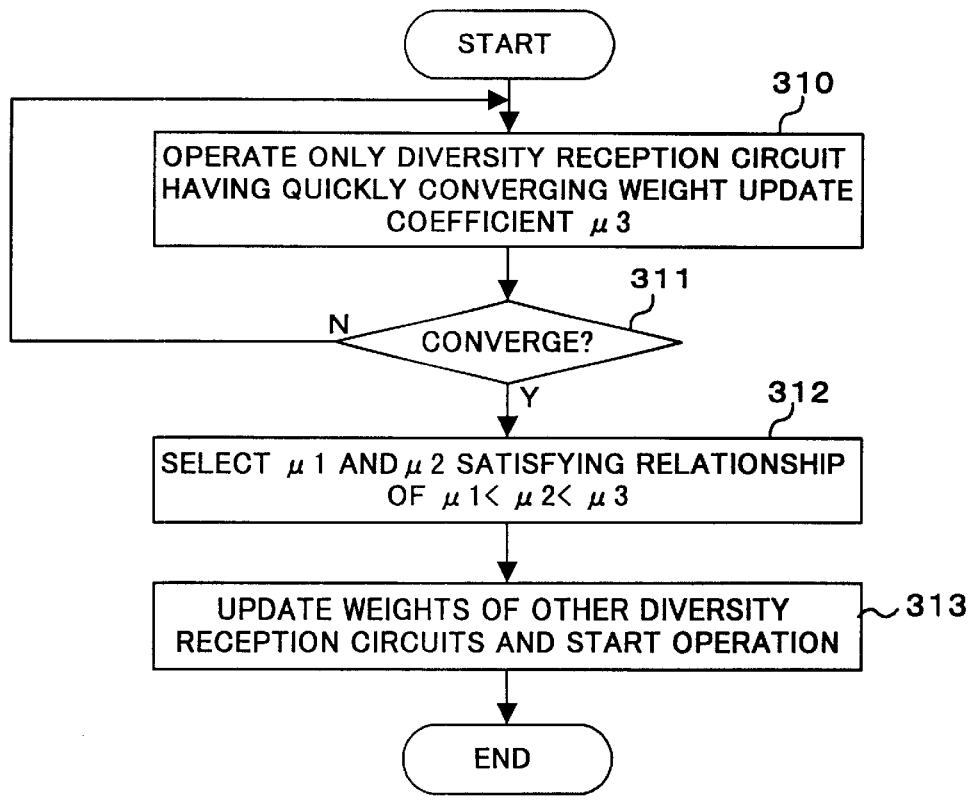
FIG. 6 is a flow diagram showing a characteristic operation of the directive reception circuit in FIG. 5.

The weight update coefficient change operation is summarized in FIG. 6.

That is, only the diversity reception circuit with fast converging weight update coefficient $\mu 3$ is operated (step 310), and if it converges (step 311), $\mu 1$ and $\mu 2$ which satisfy a relationship of $\mu 1 < \mu 2 < \mu 3$ are selected (step 312), weights of the other diversity reception circuits are updated and a reception operation is started (step 313).

As shown above, even if the direction of an incoming signal varies drastically when a mobile station moves fast, the present embodiment allows high-speed weight convergence and accurate updating of weights following up changes in the communication environment. Furthermore, in the high-speed follow-up stage, only one diversity reception circuit is operated, which also allows a reduction of power consumption of the circuit.

(Embodiment 4)

The present embodiment utilizes the weight update coefficient used for the formation of reception directivity also for the formation of transmission directivity.

FIG. 7 is a block diagram showing a configuration of a diversity communication apparatus of Embodiment 4 of the present invention.

In FIG. 7, base station 103 functions as a relay for radio communications between mobile station 100a and mobile station 100b.

The configuration and operation of the section that performs reception operation are the same as those described in the aforementioned embodiment. That is, weight update coefficients in diversity reception circuits 113 to 115 are $\mu 1$, $\mu 2$ and $\mu 3$, respectively and they have a relationship of $\mu 1 < \mu 2 < \mu 3$.

If mobile station 100a on the transmitting side is stopped, the output of diversity reception circuit 113 corresponding to "$\mu 1$" whose weight has high convergence accuracy has the best reception quality, and therefore this is selected. However, once mobile station 100a starts moving, following-up with $\mu 1$ becomes difficult, and the output of diversity reception circuit 114 corresponding to $\mu 2$ which has a greater weight update coefficient than $\mu 1$ is selected. As mobile station 100a on the transmitting side moves faster, the following-up with $\mu 2$ also becomes difficult, and thus the output of diversity reception circuit 115 corresponding to $\mu 3$ which has the highest follow-up performance is selected. This is the operation of directive reception.

Then, the operation when directivity is transmitted to mobile station 100a using a transmission wave with the same frequency as that of the reception wave is explained below.

In order to perform this directivity transmission, base station 103 comprises transmission signal formation section 400, D/A converter 403, quadrature modulator 404 and transmit amplifier 405.

Transmission signal formation section 400 comprises baseband spreading circuit 401 and transmit beam forming circuit 402. This transmit beam forming circuit 402 has the function of providing the transmission signal with directivity by multiplying a plurality of signals to be transmitted by weighting coefficients and controlling the amplitude and phase of each signal as in the case of diversity reception circuits 113 to 115.

In the present embodiment, this transmit beam forming circuit 402 multiplies the transmission signal by the coefficients with the same value as the weight update coefficients used in diversity reception circuits 113 to 115 selected at that time, provides it with transmission directivity so as to achieve the highest reception quality in mobile station 100*a* and transmits it.

That is, after the signal with the optimum reception quality is found in the reception section, transmission signal formation section 400 provides a baseband-spread transmission signal with directivity through transmit beam forming circuit 402 using the weight corresponding to the signal selected by selector 116, and transmits it from antennas 104 to 107. The transmission frequency is the same as the reception frequency.

The characteristic operation in the directivity transmission above is summarized in FIG. 8.

That is, transmission directivity is formed using the same weight (weighting coefficient) corresponding to the reception signal selected by the selector (step 406), and transmitted from a plurality of antenna elements (step 407).

As shown above, the present embodiment allows optimum reception to be performed all the time irrespective of the moving condition of the mobile station and allows transmission with the optimum directivity provided for the mobile station, which will improve the communication quality in mobile radio communications.

(Embodiment 5)

FIG. 9 is a block diagram showing a configuration of the main part of an adaptive array antenna apparatus of Embodiment 5 of the present invention.

The configuration and operation of the adaptive array antenna apparatus of the present embodiment are the same as those of the apparatus in Embodiment 4. However, when the frequency of a transmission signal is different from that of a reception signal, the present embodiment differs in that it compensates this frequency difference when providing the transmission signal with directivity.

That is, transmission signal formation section 506 in the present embodiment comprises beam form convert circuit 515, which converts weights (weighting coefficients) in selected diversity reception circuits 113 to 115 so as to compensate the frequency difference and forms transmission directivity with the converted weights (weighting coefficients).

Figure 10:
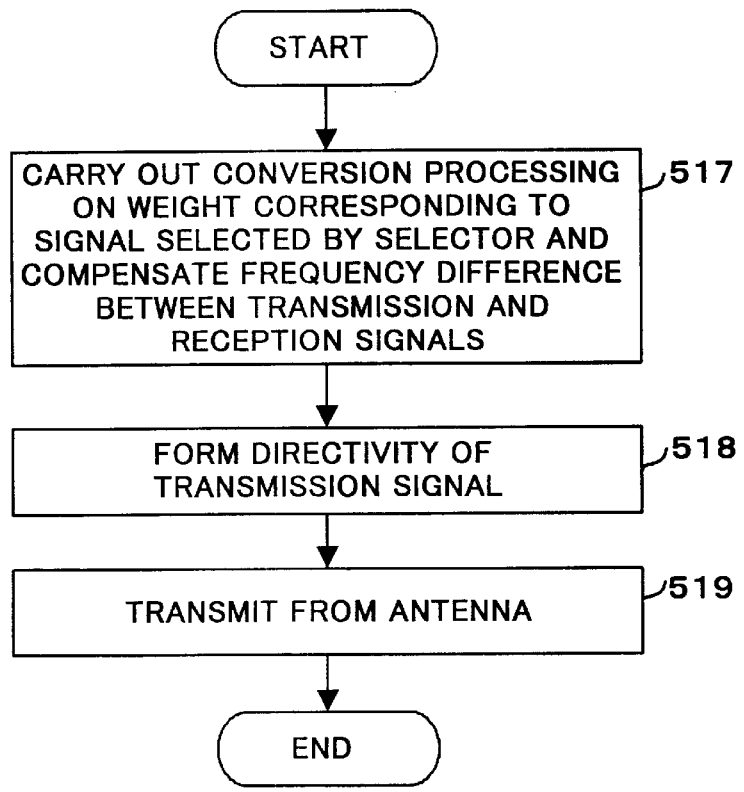
FIG. 10 is a flow diagram showing a characteristic operation in directivity transmission of the adaptive array antenna apparatus in FIG. 9.
Figure 11:
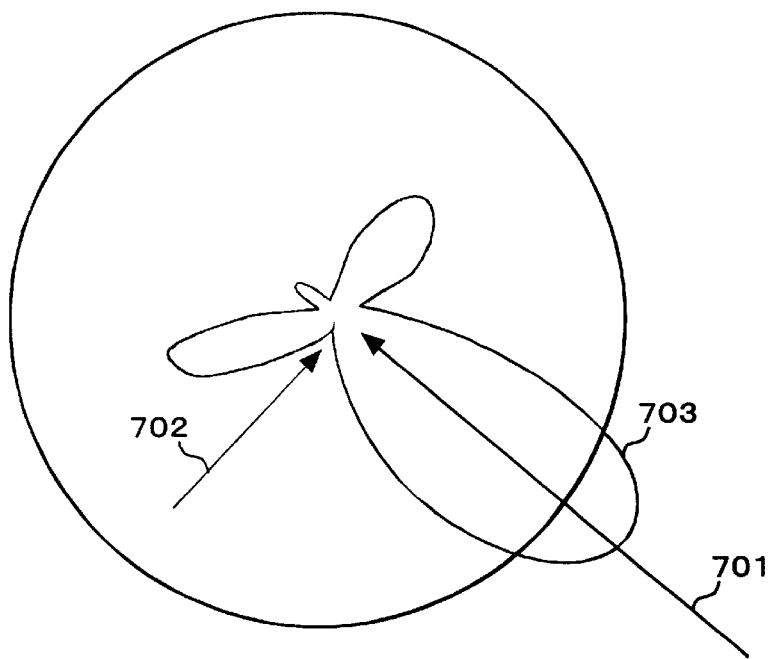
FIG. 11 is a drawing to explain the principle of directive reception of the adaptive array antenna apparatus.

The characteristic operation above is summarized in FIG. 10.

That is, a weight corresponding to a signal selected by the selector is subjected to conversion processing to compensate the frequency difference between the transmission signal and reception signal (step 517), directivity of the transmission signal is formed using the compensated weight (step 518), and the signal is transmitted from a plurality of antenna elements (step 519).

Even if the frequency of the transmission signal is different from that of the reception signal, this makes it possible to realize optimum reception all the time irrespective of the moving condition of the mobile station and transmit signals to the mobile station with the optimum directivity attached, which will improve the communication quality of mobile radio communications.

As described above, the present invention can adaptively change reception directivity (and transmission directivity) not only when the mobile station is stopped or moving slowly but also when the mobile station is moving fast and the direction of an incoming radio wave is drastically changing, which improves the communication quality.

Furthermore, the present invention can perform transmission/reception directivity formation adaptable to changes in the communication environment, realizing optimum reception without increasing the power of transmission radio waves. CDMA communications in which users who are assigned codes use a common frequency band are susceptible to interference. However, carrying out communications with field intensity suppressed can suppress interference of radio waves, resulting in an increase of the number of users who can communicate using the frequency band (communication capacity).

This application is based on the Japanese Patent Application No.HEI 10-33744 filed on Jan. 30, 1998, entire content of which is expressly incorporated by reference herein.

Industrial Applicability

As is obvious from the explanations above, the adaptive array antenna apparatus of the present invention is useful for mobile radio communications, particularly suited to quickly and accurately adapting transmission/reception directivity to changes in the communication environment.

What is claimed is:

1. A directive reception method using an array antenna, comprising:

preparing a plurality of diversity reception circuits that have different parameter values determining communication environment follow-up characteristics and are configured to update said parameter values, said plurality of diversity reception circuits processing signals from a single path of signals from multipaths received by said array antenna;

inputting signals received from a plurality of antenna elements of said array antenna to said plurality of diversity reception circuits;

operating said plurality of diversity reception circuits so as to adapt to respective communication environments to output respective reception signals for the signals from the single path; and determining reception quality of each of the reception signals output from said plurality of diversity reception circuits and selecting one of the reception signals output from said plurality of diversity reception circuits as a reception signal from the single path based on the determined reception quality.

2. A directive reception method using an array antenna, comprising the steps of:

preparing a plurality of diversity reception circuits that have different parameter initial values determining a communication environment follow-up characteristic and are capable of updating said parameter values;

inputting signals received from a plurality of antenna elements composing said array antenna to said plurality of diversity reception circuits;

operating each of said diversity reception circuits so as to adapt to the communication environment to output reception signals;

determining the reception quality of each of the outputs of said plurality of diversity reception circuits and selecting one of the outputs of said plurality of diversity reception circuits as a reception signal based on the determination result; and updating said parameter values of the other diversity reception circuits based on said parameter values in the diversity reception circuit whose output has been selected as the reception signal.

3. The directive reception method using an array antenna according to claim 2,
wherein said step of updating said parameter values of the other diversity reception circuits based on the parameter values in the diversity reception circuit whose output has been selected as the reception signal comprises the steps of:
obtaining $\mu A$ and $\mu B$ which satisfy a relationship of $\mu A<\mu 1<\mu B$, where $\mu 1$ is the basic parameter value; and
setting at least one of said $\mu A$ and $\mu B$ as said parameter value of another diversity reception circuit.

4. A directive reception method using an array antenna, comprising the steps of:
preparing at least two diversity reception circuits that have different parameter initial values determining a communication environment follow-up characteristic and are capable of updating said parameter values;
dividing at least two said diversity reception circuits into ones with greater communication environment follow-up performance and others with smaller communication environment follow-up performance, and only operating the diversity reception circuits with greater communication environment follow-up performance;
inputting signals received by a plurality of antenna elements composing said array antenna to at least two said diversity reception circuits;
operating said diversity reception circuits with greater communication environment follow-up performance so as to adapt to the communication environment to output the reception signals and;
detecting that variations of said parameters have converged within a predetermined range as a result of said diversity reception circuits with greater communication environment follow-up performance operating so as to adapt to the communication environment, and obtaining said parameter values that have converged;
setting parameter initial values in said diversity reception circuits with smaller communication environment follow-up performance which are not operating based on said converged parameter values and starting the operation of the diversity reception circuits; and
determining the reception quality of each of the outputs of at least two said diversity reception circuits which are operating and selecting one of the outputs of said plurality of diversity reception circuits based on the determination result as a reception signal.

5. The directive reception method using an array antenna according to claim 4,
wherein the step of setting parameter initial values in said diversity reception circuits with smaller communication environment follow-up performance which are not operating based on said converged parameter values and starting the operation of the diversity reception circuits comprises the steps of:
obtaining $\mu C$ and $\mu D$ which satisfy a relationship of $\mu C<\mu 2<\mu D$, where $\mu 2$ is a basic parameter value; and
setting at least one of said $\mu C$ and $\mu D$ as said parameter values of the diversity reception circuits with smaller communication environment follow-up performance which are not operating.

6. A directive reception method using an adaptive array antenna, comprising the steps of:
adaptively operating each of a plurality of diversity reception circuits which vary in communication follow-up performance so as to adapt to the communication environment, outputting reception signals from the diversity circuits in parallel and selecting the one with the best reception quality from among those reception signals; and
changing the communication environment follow-up performance of the non-selected diversity reception circuits every time said selection is made based on the environment follow-up performance of the selected diversity reception circuit and selecting each of the outputs of said plurality of diversity reception circuits again.

7. A directive reception method using an adaptive array antenna, comprising the steps of:
inputting signals received by a plurality of antenna elements composing said array antenna to each of a plurality of diversity reception circuits which are capable of multiplying signals received by a plurality of antenna elements composing said array antenna by weighting coefficients, then combining those signals to perform directive reception, updating said weighting coefficients step by step, controlling variations of said weighting coefficients per one step using a predetermined parameter value, and in which different values are set as said parameters;
operating each of said plurality of diversity reception circuits so as to adapt to the communication environment to output reception signals;
selecting one of the outputs of said plurality of diversity reception circuits as a reception signal;
setting, every time said selection is made, values close to said parameter values in the diversity reception circuit whose output has been selected as a reception signal, as said parameter values of the other non-selected diversity reception circuits and thereby changing the communication environment follow-up performance of the non-selected diversity reception circuits based on the communication environment follow-up performance of the selected diversity reception circuit; and
reselecting one of the outputs of said plurality of diversity reception circuits as a reception signal.

8. A directive reception method using an adaptive array antenna, comprising the steps of:
preparing a plurality of diversity reception circuits capable of multiplying signals received by a plurality of antenna elements composing said array antenna by weighting coefficients, then combining those signals to perform directive reception, updating said weighting coefficients step by step, and controlling variations of said weighting coefficients per one step according to predetermined parameter values;
operating one of said plurality of diversity reception circuits under operating conditions of high communication environment follow-up performance and thereby converging said parameter values necessary to follow up said communication environment within a predetermined range;
setting values close to the converged parameter values in said parameters in the other diversity reception circuits, making said other diversity reception circuits perform reception operations and selecting one of the outputs of said plurality of diversity reception circuits operating in parallel;
setting, every time said selection is made, values close to said parameter values in the diversity reception circuit whose output has been selected as a reception signal as said parameter values of the other non-selected diversity reception circuits and thereby changing the communication environment follow-up performance of the non-selected diversity reception circuits based on the communication environment follow-up performance in the selected diversity reception circuit; and reselecting one of the outputs of said plurality of diversity reception circuits as a reception signal.

9. An interference control method in CDMA communications, which controls the field intensity of transmission radio waves and reduces interference between signals in the same frequency band by receiving baseband-spread signals sent from a mobile station using the directive reception method using an adaptive array antenna according to claim 6.

10. A directive reception method using an adaptive array antenna, comprising the steps of performing directive reception and performing directivity transmission, wherein said step of performing directive reception comprises the steps of:
inputting signals received by a plurality of antenna elements composing said adaptive array antenna to each of a plurality of diversity reception circuits which are capable of multiplying signals received by a plurality of antenna elements composing said array antenna by weighting coefficients, then combining those signals to perform directive reception, updating said weighting coefficients step by step, and controlling variations of said weighting coefficients per one step according to predetermined parameter values, and in which different values are set as said parameters;
operating each of said plurality of diversity reception circuits so as to adapt to the communication environment to output reception signals;
determining the reception quality of each of the outputs of said plurality of diversity reception circuits and selecting one of the outputs of said plurality of diversity reception circuits as a reception signal based on the determination result; and
updating said parameters of the other diversity reception circuits based on said parameter values in the diversity reception circuits whose output has been selected as a reception signal, and said step of performing directivity transmission comprises the steps of:
preparing weighting coefficients for transmission directivity formation with the same value as said weighting coefficient in said directive reception circuit whose output has been selected as a reception signal; and
multiplying signals to be transmitted from a plurality of antenna elements composing said adaptive array antenna by said weighting coefficients for transmission directivity formation and controlling the amplitude and phase.

11. An adaptive array antenna apparatus, comprising a plurality of antenna elements and at least one directive reception circuit that selectively receives only those radio waves that have passed through a specific path from among incoming radio waves via a plurality of paths, wherein said directive reception circuit comprises:
a plurality of diversity reception circuits which differ in communication environment follow-up performance, comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced; and
a selector that selects one of signals output in parallel from said plurality of diversity reception circuits.

12. An adaptive array antenna apparatus, comprising a plurality of antenna elements and directive reception circuit that selectively receives only those radio waves that have passed through a specific path from among incoming radio waves via a plurality of paths, wherein said directive reception circuit comprises:
a plurality of diversity reception circuits which differ in communication environment follow-up performance, each of which comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced;
a selector that selects one of signals output in parallel from said plurality of diversity reception circuits; and
a control circuit that changes the communication environment follow-up performance of the other diversity reception circuits based on the communication environment follow-up performance of the selected diversity reception circuit every time a selection is made by said selector.

13. The adaptive array antenna apparatus according to claim 12,
wherein said control circuit changes the communication environment follow-up performance of said other diversity reception circuits by changing the amount of update per one step of said weighting coefficients.

14. The adaptive array antenna apparatus according to claim 13,
wherein the amount of update per one step of said weighting coefficients is uniquely defined by determining a predetermined parameter value, and said control circuit finds $\mu A$ and $\mu B$ that satisfy a relationship of $\mu A < \mu 1 < \mu B$, where $\mu 1$ is said parameter value of said selected diversity reception circuit, sets $\mu A$ and $\mu B$ in said other diversity reception circuits and changes their environment follow-up performance.

15. An adaptive array antenna apparatus, comprising a plurality of antenna elements and at least one directive reception circuit that selectively receives only those radio waves that have passed through a specific path from among incoming radio waves via a plurality of paths, wherein said each of directive reception circuit comprises:
a plurality of diversity reception circuits which differ in communication environment follow-up performance, comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced, wherein the amount of update per one step of said weighting coefficients is uniquely defined by determining a predetermined parameter value;

a selector that selects one of signals output in parallel from said plurality of diversity reception circuits; and a control circuit that, if said weighting coefficient has not converged, operates a diversity reception circuit with follow-up performance appropriate to quickly converge the weighting coefficient, puts other diversity reception circuits in a non-operating state, then after said weighting coefficient has converged, sets a value determined based on parameter values of the diversity reception circuits in operation as said parameters in said other non-operating diversity reception circuits, starts the operation of said other diversity reception circuits and updates the parameter values of the other non-selected diversity reception circuits based on the parameter values of the selected diversity reception circuits every time a selection is made by said selector.

16. The adaptive array antenna apparatus according to claim 15, wherein said control circuit finds $\mu A$ and $\mu B$ that satisfy a relationship of $\mu A < \mu 1 < \mu B$, where $\mu 1$ is said parameter value of said selected diversity reception circuit, sets $\mu A$ and $\mu B$ as parameter values of said other diversity reception circuits and changes their environment follow-up performance.

17. An adaptive array antenna apparatus, comprising:

a plurality of antenna elements;

a plurality of directive reception circuits that selectively receive only those radio waves that have passed through a specific path from among incoming radio waves via a plurality of paths; and a combination circuit that combines the reception outputs of said plurality of directive reception circuits according to a RAKE system, wherein each of said plurality of directive reception circuits comprises:

a plurality of diversity reception circuits which differ in communication environment follow-up performance, comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced;

a selector that selects one of signals output in parallel from said plurality of diversity reception circuits; and a control circuit that changes the communication environment follow-up performance of the other diversity reception circuits based on the communication environment follow-up performance of the selected diversity reception circuit every time a selection is made by said selector.

18. The adaptive array antenna apparatus according to claim 12, further comprising a directivity formation circuit that provides the transmission signal with directivity using the same weighting coefficient as said weighting coefficient in said selected diversity reception circuit.

19. The adaptive array antenna apparatus according to claim 12, further comprising:

a compensation circuit that compensates said weighting coefficient in said selected diversity reception circuit according to a difference between transmission and reception frequencies; and a directivity formation circuit that provides the transmission signal with directivity using a weighting coefficient compensated by this compensation circuit.

20. A CDMA communication apparatus that carries out reception processing on a baseband-spread signal using the adaptive array antenna apparatus according to claim 12.

21. A base station apparatus that carries out reception processing or transmission processing on a baseband-spread signal received/sent from/to a mobile body using the adaptive array antenna apparatus according to claim 18.

22. A directive reception method using an adaptive array antenna, comprising the steps of:

inputting signals received by a plurality of antenna elements composing said adaptive array antenna to each of a plurality of diversity reception circuits which are capable of multiplying signals received by a plurality of antenna elements composing said array antenna by weighting coefficients, then combining those signals to perform directive reception, updating said weighting coefficients step by step, and controlling variations of said weighting coefficients per one step using a predetermined parameter value, and in which different values are set as said parameters;

operating each of said diversity reception circuits so as to adapt to the communication environment to output reception signals;

selecting one of the outputs of said plurality of diversity reception circuits as a reception signal;

setting, every time said selection is made, said weighting coefficient value in the selected diversity reception circuit whose output has been selected as the reception signal as the weighting coefficient value of the other non-selected diversity reception circuits and setting values close to said parameter values in the diversity reception circuit whose output has been selected as the reception signal as said parameter values of the other non-selected diversity reception circuits; and reselecting one of the outputs of said plurality of diversity reception circuits as a reception signal.

23. A directive reception method using an adaptive array antenna, comprising the steps of:

preparing a plurality of diversity reception circuits which are capable of multiplying signals received by a plurality of antenna elements composing said array antenna by weighting coefficients, then combining those signals to perform directive reception, updating said weighting coefficients step by step, and controlling variations of said weighting coefficients per one step using a predetermined parameter value;

operating one of said plurality of diversity reception circuits under operating conditions of high communication environment follow-up performance and thereby converging said weighting coefficients and said parameter value necessary to follow up said communication environment within a predetermined range;

setting said weighting coefficient value that has converged as a weighting coefficient of the other diversity reception circuits, setting a value close to said converged parameter value in said parameters in the other diversity reception circuits, making said other diversity reception circuits perform reception operations and selecting one of the outputs of said plurality of diversity reception circuits operating in parallel;

setting, every time said selection is made, said weighting coefficient in the diversity reception circuit whose output has been selected as the reception signal as the weighting coefficients of the other diversity reception circuits and setting values close to said parameter values in said selected diversity reception circuit as said parameters of the other non-selected diversity reception circuits; and reselecting one of the outputs of said plurality of diversity reception circuits as a reception signal.

24. An adaptive array antenna apparatus, comprising a plurality of antenna elements and a directive reception circuit that selectively receives only those radio waves that have passed through a specific path from among incoming radio waves via a plurality of paths, wherein said directive reception circuit comprises:

a plurality of diversity reception circuits which differ in communication environment follow-up performance, comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced;

a selector that selects one of signals output in parallel from said plurality of diversity reception circuits; and a control circuit that changes the communication environment follow-up performance of the other diversity reception circuits based on the communication environment follow-up performance of the selected diversity reception circuit every time a selection is made by said selector, wherein said control circuit not only sets said weighting coefficient of the selected diversity reception circuit as the weighting coefficient of the other diversity reception circuits, but also changes the communication environment follow-up performance of said other diversity reception circuits by changing the amount of update per one step of said weighting coefficients.

25. An adaptive array antenna apparatus, comprising a plurality of antenna elements and at least one directive reception circuit that selectively receives only those radio waves that have passed through a specific path from among incoming radio waves via a plurality of paths, wherein said directive reception circuit comprises:

a plurality of diversity reception circuits, each of which differ in communication environment follow-up performance, comprising a multiplication circuit that multiplies signals received by said plurality of antenna elements by weighting coefficients, addition circuit for combining the outputs of said multiplication circuit, error detection circuit that detects an error between the output of this addition circuit and a control target value, update circuit that updates said weighting coefficients step by step so that said error may be reduced, wherein the amount of update per one step of said weighting coefficients is uniquely defined by determining a predetermined parameter value;

a selector that selects one of signals output in parallel from said plurality of diversity reception circuits; and a control circuit that, if said weighting coefficient has not converged, operates a diversity reception circuit with follow-up performance appropriate to quickly converge the weighting coefficient, puts other diversity reception circuits in a non-operating state, then after said weighting coefficient and said parameter have converged, sets said converged weighting coefficient in said other non-operating diversity reception circuit, sets a value determined based on said converged parameter values as parameters of said other diversity reception circuits, starts the operation of said other diversity reception circuits and updates the weighting coefficient values and the parameter values of the other non-selected diversity reception circuits based on said weighting coefficient and said parameter value of the selected diversity reception circuit every time a selection is made by said selector.

* * * * *

UNITED STATES PATENT AND TRADEMARK OFFICE
CERTIFICATE OF CORRECTION

PATENT NO.    : 6,498,804 B1
DATED         : December 24, 2002
INVENTOR(S)   : M. Ide et al.

It is certified that error appears in the above-identified patent and that said Letters Patent is hereby corrected as shown below:

Title page,
Item [56], References Cited, OTHER PUBLICATIONS, the following should be included:
-- English Language Abstract of JP 7-86972. --

Signed and Sealed this

Eighteenth Day of January, 2005

JON W. DUDAS
*Director of the United States Patent and Trademark Office*